(12) United States Patent
Shimauchi et al.

(10) Patent No.: US 11,802,617 B2
(45) Date of Patent: Oct. 31, 2023

(54) METHOD OF MANUFACTURING SINTERED GEAR

(71) Applicants: Sumitomo Electric Industries, Ltd., Osaka (JP); Sumitomo Electric Sintered Alloy, Ltd., Takahashi (JP)

(72) Inventors: Kazunari Shimauchi, Osaka (JP); Tomoyuki Ueno, Osaka (JP); Tomoyuki Ishimine, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 0 days.

(21) Appl. No.: 18/029,377

(22) PCT Filed: Sep. 29, 2021

(86) PCT No.: PCT/JP2021/035750
§ 371 (c)(1),
(2) Date: Mar. 30, 2023

(87) PCT Pub. No.: WO2022/085380
PCT Pub. Date: Apr. 28, 2022

(65) Prior Publication Data
US 2023/0287970 A1     Sep. 14, 2023

(30) Foreign Application Priority Data

Oct. 22, 2020   (JP) ................................ 2020-177643

(51) Int. Cl.
*F16H 55/17*   (2006.01)
*B22F 3/10*    (2006.01)
(Continued)

(52) U.S. Cl.
CPC ............... *F16H 55/17* (2013.01); *B22F 3/10* (2013.01); *B22F 5/08* (2013.01); *B23F 19/108* (2013.01); *B22F 2301/355* (2013.01)

(58) Field of Classification Search
CPC ........ F16H 55/17; B23F 19/00; B23F 19/108; B24B 9/00; B24B 29/005; B22F 5/08; (Continued)

(56) References Cited

U.S. PATENT DOCUMENTS

2017/0259360 A1    9/2017   Nakata
2017/0368624 A1    12/2017  Nakata et al.
(Continued)

FOREIGN PATENT DOCUMENTS

JP    53-125914 A   11/1978
JP    6-288206 A    10/1994
(Continued)

OTHER PUBLICATIONS

Machine Translation for JP2020082203 (Year: 2020).*
Notice of Reasons for Refusal dated Aug. 4, 2022, received for JP Application 2022-504610, 6 pages including English Translation.
Decision to Grant dated Nov. 21, 2022, received for JP Application 2022-504610, 5 pages including English Translation.

*Primary Examiner* — David P Bryant
*Assistant Examiner* — Christine Bersabal
(74) *Attorney, Agent, or Firm* — XSENSUS LLP

(57) ABSTRACT

A method of manufacturing a sintered gear includes preparing a green compact having two gear-shaped end surfaces, one on each of two sides in an axial direction of the green compact, and having a plurality of teeth on an outer peripheral surface formed between the two end surfaces; chamfering an edge of the teeth by a brush; and sintering the green compact. The brush is a wheel-type brush including a disk-shaped wheel and a bristle member radially protruding from an outer periphery of the wheel. The chamfering includes disposing the brush with respect to the green compact such that the axial direction of the green compact (Continued)

and an axial direction of the wheel intersect with each other; bringing a tip of the bristle member into contact with a tooth bottom edge; and relatively moving the brush in a circumferential direction of the green compact while rotating the brush.

6 Claims, 7 Drawing Sheets

(51) Int. Cl.
    *B23F 19/10*      (2006.01)
    *B22F 5/08*      (2006.01)

(58) Field of Classification Search
    CPC ........ B22F 5/24; B22F 3/10; B22F 2301/355; B24D 13/10
    See application file for complete search history.

(56) References Cited

U.S. PATENT DOCUMENTS

2018/0236548 A1    8/2018    Ishimine et al.
2019/0314912 A1*  10/2019   Töpfer ................ B24B 9/00

FOREIGN PATENT DOCUMENTS

| | | |
|---|---|---|
| JP | 2008-303432 A | 12/2008 |
| JP | 3151149 U | 6/2009 |
| JP | 2017-159400 A | 9/2017 |
| JP | 2017-159401 A | 9/2017 |
| JP | 2017-186625 A | 10/2017 |
| JP | 2017-226043 A | 12/2017 |
| JP | 2019-188592 A | 10/2019 |
| JP | 2020-082203 A | 6/2020 |
| JP | 2020082203 A * | 6/2020 |

* cited by examiner

METHOD OF MANUFACTURING SINTERED GEAR

CROSS-REFERENCE TO RELATED APPLICATIONS

The present application is based on PCT filing PCT/JP2021/035750, filed Sep. 29, 2021, and claims priority to JP 2020-177643, filed Oct. 22, 2020, the entire contents of each are incorporated herein by reference.

TECHNICAL FIELD

The present disclosure relates to a method of manufacturing a sintered gear.

BACKGROUND ART

As metal gears in the related art, there are gears made of sintered materials and gears made of molten materials. PTL 1 discloses a gear made of a sintered material. PTL 2 to PTL 4 disclose gears made of molten materials. Hereinafter, a gear made of a sintered material is referred to as a sintered gear. A gear made of a molten material is referred to as a molten gear. PTL 1 discloses that a green compact is sintered after forming teeth by performing cutting on the green compact. PTL 5 discloses that burrs generated on an edge portion of a gear that is a green compact are removed by a wire brush.

CITATION LIST

Patent Literature

PTL 1: Japanese Unexamined Patent Application Publication No. 2017-186625
PTL 2: Japanese Unexamined Patent Application Publication No. 2017-159400
PTL 3: Japanese Unexamined Patent Application Publication No. 2017-159401
PTL 4: Japanese Unexamined Patent Application Publication No. 2017-226043
PTL 5: Japanese Unexamined Patent Application Publication No. 2008-303432

SUMMARY OF INVENTION

A method of manufacturing a sintered gear according to the present disclosure includes: preparing a green compact having two gear-shaped end surfaces, one on each of two sides in an axial direction of the green compact, and having a plurality of teeth on an outer peripheral surface formed between the two end surfaces; chamfering an edge of the teeth by a brush, the edge being constituted by the end surfaces and the outer peripheral surface; and sintering the green compact that has been chamfered. The brush is a wheel-type brush including a disk-shaped wheel and a bristle member radially protruding from an outer periphery of the wheel. The chamfering includes disposing the brush with respect to the green compact such that the axial direction of the green compact and an axial direction of the wheel intersect with each other; bringing a tip of the bristle member into contact with a tooth bottom edge that is constituted by the end surfaces of the green compact and a tooth bottom surface of the teeth at the outer peripheral surface; and relatively moving the brush in a circumferential direction of the green compact while rotating the brush.

EMBODIMENTS FOR IMPLEMENTING INVENTION

Figure 1A:
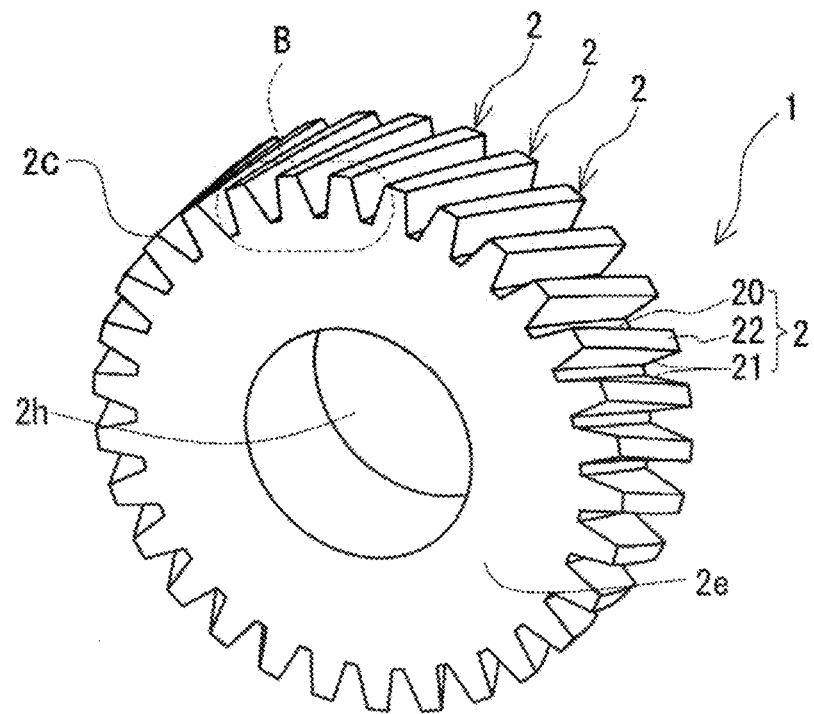
FIG. 1A is a schematic perspective view illustrating one example of a sintered gear.

To improve productivity of a sintered gear, the present inventors have studied chamfering of the edge of teeth of a gear-shaped green compact.

Conventionally, phrasing, cutting in which a cutting tool is advanced and retreated with respect to teeth at a high speed, profiling using a rotary tool such as an end mill are used for chamfering of the edge of teeth of a molten gear. In phrasing, the edge is crushed, thereby chamfering the edge. In cutting in which a cutting tool is advanced and retreated at a high speed, the cutting tool is supported by a drive mechanism that advances and retreats along the axial direction of a shank portion. While the gear is rotated about the axis of the gear, the cutting tool is advanced toward the teeth at a high speed, thereby chamfering an edge. The gear is rotated while the cutting tool is retreated, and chamfering of a next edge is performed. In profiling, the rotary tool is moved such that the rotary tool follows and moves along an edge, thereby chamfering the edge.

The machining time of profiling tends to be long. This is because, in order to cause the rotary tool to follow the shape of the gear, it is not possible to increase the feeding speed of the rotary tool. In addition, in order to apply profiling to a green compact, it is required to decrease the machining speed compared to when applying profiling to a molten material. Green compacts before sintering are inferior in mechanical strength to molten materials. Thus, when the machining speed is increased, the green compact is easily chipped by the rotary tool that collides with the green compact. Further, a setting time of numerical control for causing the rotary tool to follow also tends to be long. Even when set shapes of gears are the same, shape errors are generated within a tolerance range. It is thus required to set conditions of following for each gear. For these reasons, a machining cycle time including the setting time is relatively long when profiling is applied to green compacts. For example, the machining cycle time is three minutes or more. In other words, profiling is not suitable for mass production. The machining cycle time is a time required to complete chamfering of the edge of all of the teeth of one gear.

Meanwhile, the machining cycle time is usually relatively short in phrasing and cutting using a cutting tool. For example, the machining cycle time is 30 seconds or less. In other words, phrasing and cutting using a cutting tool are suitable for mass production. Green compacts are, however, chipped when the green compacts are subjected to phrasing or cutting in which a cutting tool is advanced and retreated at a high speed. As described above, green compacts are inferior in mechanical strength to molten materials. Green compacts are thus chipped by being pressed by a machining tool used in phrasing or by colliding with a cutting tool that advances at a high speed. As a result, it is practically not possible to perform chamfering appropriately.

The present inventors have found a method of appropriately chamfering the edge of teeth of a green compact. Consequently, the method of manufacturing a sintered gear according to the present disclosure has been accomplished.

DESCRIPTION OF EMBODIMENTS OF PRESENT DISCLOSURE

Hereinafter, embodiments of the present disclosure will be listed and described.

(1) A method of manufacturing a sintered gear according to an embodiment of the present disclosure includes:
preparing a green compact having two gear-shaped end surfaces, one on each of two sides in an axial direction of the green compact, and having a plurality of teeth on an outer peripheral surface formed between the two end surfaces;
chamfering an edge of the teeth by a brush, the edge being constituted by the end surfaces and the outer peripheral surface; and
sintering the green compact that has been chamfered,
in which the brush is a wheel-type brush including a disk-shaped wheel and a bristle member radially protruding from an outer periphery of the wheel, and
in which the chamfering includes
disposing the brush with respect to the green compact such that the axial direction of the green compact and an axial direction of the wheel intersect with each other,
bringing a tip of the bristle member into contact with a tooth bottom edge that is constituted by the end surfaces of the green compact and a tooth bottom surface of the teeth at the outer peripheral surface, and
relatively moving the brush in a circumferential direction of the green compact while rotating the brush.

The edge of the teeth is a corner portion that is a ridge constituted by the end surfaces and the outer peripheral surface. The edge of the teeth includes the tooth bottom edge, a tooth surface edge, and a tooth tip edge. The tooth bottom edge is an edge constituted by the end surfaces of the gear-shaped green compact and the tooth bottom surface. The tooth surface edge is an edge constituted by the end surfaces of the green compact and a tooth surface. The tooth tip edge is an edge constituted by the end surfaces of the green compact and the tooth tip surface.

The method of manufacturing the sintered gear according to the present disclosure is excellent in productivity of the sintered gear. In the method of manufacturing according to the present disclosure, chamfering of the edge of the teeth is performed by a brush. The brush used for chamfering is a wheel-type brush. A rotary shaft is attached to the wheel-type brush at the center axis of a wheel. In chamfering of the edge of the teeth, the edge of the teeth is shaved off by rotating the brush and bringing the bristle member into contact with the edge of the teeth. The bristle member has flexibility. It is thus easy, even when the rotation speed of the brush or the relative moving speed of the brush with respect to the green compact is increased to some extent, to prevent the green compact from being chipped and being excessively shaved locally. In other words, even when the machining speed is increased, the edge of the teeth can be appropriately chamfered. With the machining speed that can be increased, it is possible to shorten the machining cycle time. Accordingly, the method of manufacturing according to the present disclosure is excellent in productivity of the sintered gear.

By the method of manufacturing the sintered gear according to the present disclosure, it is possible to chamfer the edge of the teeth favorably. In the method of manufacturing the sintered gear according to the present disclosure, the wheel-type brush is disposed with respect to the green compact such that respective axial directions intersect with each other. Then, the brush is rotated in a state in which the tip of the bristle member is in contact with the above-described tooth bottom edge. That is, the brush is caused to rotate about the axis of the wheel. By performing chamfering b such a method, the bristle member is easily inserted into spaces between the teeth adjacent to each other. Therefore, the edge including all of the tooth bottom edge, the tooth surface edge, and the tooth tip edge can be favorably chamfered.

Further, by performing chamfering by the method described above, the bristle member can be brought into contact with, of the end surfaces of the green compact, only the teeth and the vicinity of the teeth. In other words, it is possible to significantly prevent, of the end surfaces of the green compact, a region positioned radially inside from the tooth bottom surface from being shaved off by the bristle member. Thus, most of the end surfaces of the green compact is not machined. Most of the end surfaces of the green compact is maintained to be in a state before machining. Accordingly, the flatness of the end surfaces of the green compact is easily maintained. As a result of the flatness of the end surfaces of the green compact being maintained, the flatness of the end surfaces of the sintered gear is also maintained properly. For example, in tooth-surface grinding of the sintered gear, the tooth-surface grinding can be favorably performed by using the end surfaces of the sintered gear as reference surfaces. Hereinafter, the tooth-surface grinding is referred to as gear grinding.

(2) As one form of the method of manufacturing the sintered gear according to the present disclosure,
for example, in the chamfering, an amount of cutting in a radial direction of the green compact by the brush is 0.3 mm to 2 mm, and an amount of cutting in the axial direction of the green compact by the brush is 0.3 mm to 2 mm.

The amount of cutting in the radial direction is a distance in the radial direction of the green compact from an edge constituted by an end surface of the green compact and the tooth bottom surface, that is, the tooth bottom edge to an intersection point at which an imaginary peripheral edge of the bristle member intersects with the end surface of the green compact. The amount of cutting in the axial direction is a distance in the axial direction of the green compact from the tooth bottom edge to an intersection point at which the imaginary peripheral edge of the bristle member intersects with the tooth bottom surface.

In the aforementioned form, by setting the amount of cutting in the radial direction and the amount of cutting in the axial direction to be within the aforementioned ranges, it is possible to chamfer the edge of the teeth favorably. For example, by setting the amount of cutting in the radial direction to 0.3 mm or more and the amount of cutting in the axial direction to 0.3 mm or more, it is possible to cause the amount of chamfering at the edge of the teeth to be, for example, 0.1 mm or more, or further, 0.2 mm or more. By setting the amount of cutting in the radial direction to 2 mm or less and the amount of cutting in the axial direction to 2 mm or less, it is possible to machine only the teeth and the vicinity of the teeth. In other words, it is possible to prevent portions other than the vicinity of the teeth from being machined. In particular, when the amount of cutting in the radial direction is set to 2 mm or less, most of the end surfaces of the green compact is allowed to be not machined. It is thus possible to maintain most of the end surfaces of the green compact to be in a state before machining.

(3) As one form of the method of manufacturing the sintered gear according to the present disclosure, for example, in the chamfering, the brush is rotated in a direction from an end surface of the green compact toward the tooth bottom surface.

In the aforementioned form, by setting the rotation direction of the brush to a direction in which the tip of the bristle member moves from an end surface of the green compact so as to pass the tooth bottom surface, it is possible to chamfer the edge of the teeth efficiently.

(4) As one form of the method of manufacturing the sintered gear according to the present disclosure, for example, in the chamfering, the green compact is caused to rotate on an axis of the green compact.

In the aforementioned form, by causing the green compact to rotate on the axis of the green compact, that is, rotating the green compact about the axis thereof, it is possible to move the brush in the circumferential direction of the green compact in a state in which the position of the brush is fixed. The brush may be caused to revolve around the green compact to relatively move the brush in the circumferential direction of the green compact. When the green compact is caused to rotate on its axis, control is easier than when the brush is caused to revolve.

(5) As one form of the method of manufacturing the sintered gear according to the present disclosure, for example, a width of the bristle member in the axial direction of the wheel is larger than an interval between the teeth adjacent to each other.

In the aforementioned form, with the width of the bristle member being larger than the interval, that is, a pitch between the teeth adjacent to each other, it is possible to chamfer the edge of the teeth efficiently. The interval between the teeth is a distance between the teeth adjacent to each other on a reference circle. The diameter of the reference circle can be obtained by [module×the number of teeth]. The interval of the teeth can be obtained by [circumference of the reference circle/the number of teeth].

(6) As one form of the method of manufacturing the sintered gear according to the present disclosure, for example, in the chamfering, a rotation speed of the brush is 200 m/min to 800 m/min.

In the aforementioned form, by setting the rotation speed of the brush to be within the aforementioned range, it is possible to chamfer the edge of the teeth favorably. By setting the rotation speed of the brush to 200 m/min or more, it is possible to shorten the machining cycle time. By setting the rotation speed of the brush to 800 m/min or less, it is possible to reduce damage to the green compact and to the bristle member due to the bristle member coming into contact with the green compact.

(7) As one form of the method of manufacturing the sintered gear according to the present disclosure, for example, the bristle member is constituted by resin fiber containing abrasive grains.

In the aforementioned form, with the bristle member being constituted by the resin fiber containing the abrasive grains, it is possible to chamfer the edge of the teeth efficiently. Examples of the fiber constituting the bristle member are resin fiber, metal fiber, and the like. In particular, resin fiber containing abrasive grains has both flexibility and rigidity in a favorable balance. Hereinafter, resin fiber containing abrasive grains may be referred to as abrasive-grain-contained resin fiber. With the abrasive-grain-contained resin fiber, the bristle member can come into contact with the edge sufficiently due to the flexibility of the resin fiber. Further, the abrasive grains are exposed from the surface of the fiber, and the edge can be efficiently shaved off by the abrasive grains.

(8) As one form of the method of manufacturing the sintered gear according to the present disclosure, for example, an amount of chamfering at an edge of each of the teeth is 0.1 mm to 1.0 mm.

In the aforementioned form, by setting the amount of chamfering at the edge of the teeth to be within the aforementioned range, it is easy to effectively prevent the edge of the sintered gear from being chipped.

(9) As one form of the method of manufacturing the sintered gear according to the present disclosure, for example, a relative density of the green compact is 93% or more.

In the aforementioned form, it is possible to further improve the productivity of the sintered gear. In the aforementioned form, the relative density of the green compact is 93% or more, which is high. Chips, cracks, and the like are not easily generated during chamfering in such a dense green compact having high mechanical strength. That is, it is possible to favorably perform chamfering easily and possible to reduce generation of defective products. Therefore, the yield is increased.

(10) As one form of the method of manufacturing the sintered gear according to the present disclosure, for example, powder constituting the green compact includes first mixed powder constituted by iron powder and nonferrous element powder, second mixed powder constituted by iron-based alloyed powder and nonferrous element powder, or iron-based alloyed powder.

In the aforementioned form, it is possible to manufacture an iron sintered gear made of an iron-based alloy. The iron-based alloy is excellent in mechanical properties such as strength, rigidity, and abrasion-resistant. Therefore, in the aforementioned form, it is possible to manufacture a sintered gear excellent in mechanical properties.

DETAILS OF EMBODIMENTS OF PRESENT DISCLOSURE

Hereinafter, embodiments of the present disclosure will be described specifically with reference to the drawings. Identical signs in the drawings denote identically named components.

[Sintered Gear]

<Outline>

First, with reference to mainly FIG. 1A and FIG. 1B, a sintered gear 1 will be described.

The sintered gear 1 illustrated in FIG. 1A is a helical external gear. The sintered gear 1 has a cylindrical shape with a through hole 2h and has a plurality of teeth 2 on an outer peripheral surface 2c. The end surfaces 2e positioned one each on two sides in the axial direction of the sintered gear 1, that is, in the axial direction of the through hole 2h are smooth flat surfaces. The outer peripheral surface 2c is provided between the two end surfaces 2e so as to connect the two sides in the axial direction. The through hole 2h is provided at the center of the sintered gear 1. The shape of the gear illustrated in FIG. 1A is an example and can be changed, as appropriate. An example of the gear having the other shape is a cylindrical gear such as a spur gear or a bevel gear. The cylindrical gear may be an internal gear having a plurality of teeth on the inner peripheral surface thereof.

Figure 1B:
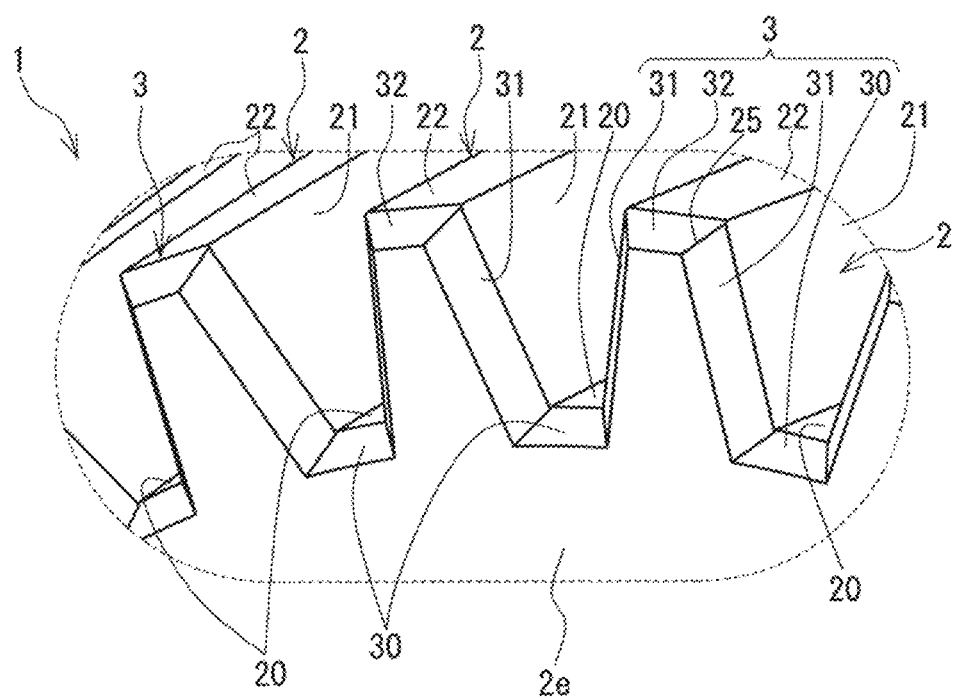
FIG. 1B is an enlarged schematic perspective view illustrating a portion B surrounded by the dashed line in the sintered gear illustrated in FIG. 1A.

As illustrated in an enlarged view in FIG. 1B, the teeth 2 of the sintered gear 1 are constituted by, mainly, a tooth bottom surface 20, a tooth surface 21, and a tooth tip surface 22. The tooth bottom surface 20 is a surface that constitutes the bottoms of tooth grooves. The tooth grooves are spaces provided between the teeth 2 adjacent to each other. The tooth tip surface 22 is a surface that constitutes the tips of the teeth 2. The tooth bottom surface 20 and the tooth tip surface 22 are surfaces that rotate coaxially with the axis of the sintered gear 1. The tooth surface 21 is a surface between the tooth bottom surface 20 and the tooth tip surface 22. The tooth surface 21 is to be in contact with a tooth surface of another gear, not illustrated, that meshes with the sintered gear 1. While the tooth surface 21 in FIG. 1A and FIG. 1B is a flat surface, the tooth surface 21 may be, for example, an involute curved surface or the like.

Further, the edge of the teeth 2 of the sintered gear 1 is chamfered. The sintered gear 1 thus includes a chamfered portion 3 at a corner portion on the side of each end surface 2e of the teeth 2. The chamfered portion 3 is formed in a manufacturing process of the sintered gear 1 by chamfering an edge 4, which is a ridge between the end surface 2e and the surfaces, which are the tooth bottom surface 20, the tooth surface 21, and the tooth tip surface 22, constituting the teeth 2 of a green compact 10 illustrated in FIG. 2A. In FIG. 1A, the chamfered portion 3 is omitted.

<Composition>

A main constituent material of the sintered gear 1 is metal. The metal that constitutes the sintered gear 1 is preferably an iron-based alloy. The iron-based alloy here is an alloy that contains 80 mass % or more, preferably, 90 mass % or more of Fe (iron). Such an iron-based alloy is excellent in mechanical properties such as strength, rigidity, and abrasion-resistant. The sintered gear 1 made of an iron-based alloy is thus excellent in mechanical properties.

A specific composition of the iron-based alloy is, for example, a composition in which at least one nonferrous element selected from the group consisting of Cu (copper), Ni (nickel), Sn (tin), Cr (chromium), Mo (molybdenum), Mn (manganese), and C (carbon) is included and in which the balance is constituted by Fe and inevitable impurities. A representative example of the iron-based alloy containing C is steel such as carbon steel or alloy steel. The alloy steel, in particular, alloy steel that contains at least one selected from the group consisting of Ni, Mo, and Mn is excellent in mechanical strength and preferable.

The total content of the nonferrous metal elements of Cu, Ni, Sn, Cr, Mo, Mn, and the like is, for example, 0.5 mass % to 5.0 mass %. Further, the aforementioned total content may be 1.0 mass % to 3.0 mass %.

The content of C is, for example, 0.2 mass % to 2.0 mass %. Further, the content of C may be 0.4 mass % to 1.0 mass %.

The composition of a raw material powder is preferably adjusted to form the sintered gear 1 with a desired composition.

<Relative Density>

The relative density of the sintered gear 1 is preferably high. This is because the sintered gear 1 that is dense is excellent in mechanical properties such as strength, rigidity, and abrasion-resistant. The relative density of the sintered gear 1 is, for example, 93% or more. Having a relative density of 93% or more, the sintered gear 1 is dense with very few pores. The relative density of the sintered gear 1 is preferably 95% or more, or further, 96% or more or 97% or more. Such a dense sintered gear 1 can be manufactured by using a dense green compact as a material in a manufacturing process.

The relative density of the sintered gear 1 can be obtained as follows.

The relative density is a ratio of apparent density to true density. The relative density (%) can be obtained by [apparent density/true density×100]. The apparent density of the sintered gear 1 can be measured by, for example, the Archimedes' method using water. The true density of the sintered gear 1 can be calculated, for example, from the composition of the sintered gear 1.

Typically, a pressing direction when a green compact is compacted in the manufacturing process of the sintered gear 1 is, for example, a direction parallel to the axial direction of the through hole 2h. In this case, the axial direction of the sintered gear 1 is substantially equal to the pressing direction.

The sintered gear 1 may include pores. However, as described above, it is preferable that less pores are included. It can be said that the higher the relative density, the less the pores.

<Chamfered Portion>

As illustrated in FIG. 1B, the chamfered portion 3 of the sintered gear 1 includes a tooth-bottom chamfered portion 30, a tooth-surface chamfered portion 31, and a tooth-tip chamfered portion 32. The tooth-bottom chamfered portion 30 is provided at a corner portion between each end surface 2e and the tooth bottom surface 20. The tooth-surface chamfered portion 31 is provided at a corner portion between each end surface 2e and the tooth surface 21. The tooth-tip chamfered portion 32 is provided at a corner portion between each end surface 2e and the tooth tip surface 22.

A constituent surface of the chamfered portion 3 is, for example, a curved surface. The constituent surface of the chamfered portion 3 may partially include a flat surface. In FIG. 1B, the constituent surfaces of the tooth-bottom chamfered portion 30, the tooth-surface chamfered portion 31, and the tooth-tip chamfered portion 32, which are included in the chamfered portion 3, are illustrated planarly for convenience. The chamfered portion 3 that includes a curved surface can be formed in the manufacturing process of the sintered gear 1 by chamfering the edge 4 of the teeth 2 of the green compact 10 illustrated in FIG. 2A by using a brush. Chamfering using a brush will be described later.

<Amount of Chamfering>

Figure 3:
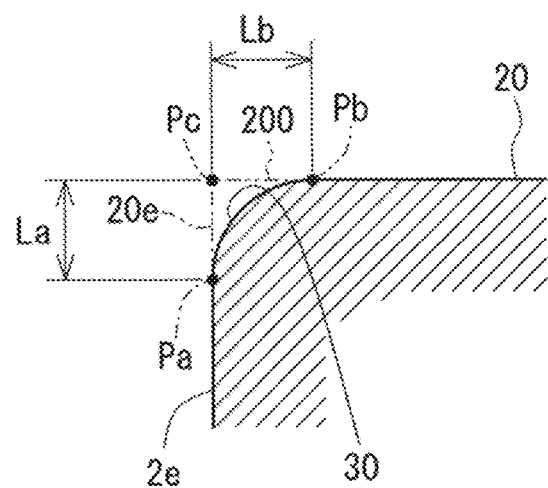
FIG. 3 describes the amount of chamfering.

With reference to FIG. 3, an amount of chamfering of the chamfered portion 3 at the edge of the teeth 2 in FIG. 1B will be described.

FIG. 3 is a partial sectional view schematically illustrating a state in which, in the vicinity of the tooth-bottom chamfered portion 30 illustrated in FIG. 1B, the tooth bottom surface 20 is cut along a plane that includes the axis of the sintered gear 1. The tooth-bottom chamfered portion 30 will be described below as an example. The matters relating to the amount of chamfering of the tooth-bottom chamfered portion 30 is also applicable to the tooth-tip chamfered portion 32 and the tooth-surface chamfered portion 31. For the amount of chamfering of the tooth-tip chamfered portion 32, "tooth bottom surface 20" and "tooth-bottom chamfered portion 30" in FIG. 3 should be read as "tooth tip surface 22" and "tooth-tip chamfered portion 32". For the amount of chamfering of the tooth-surface chamfered portion 31, "tooth bottom surface 20" and "tooth-bottom chamfered portion 30" in FIG. 3 should be read as "tooth surface 21" and "tooth-surface chamfered portion 31".

The amount of chamfering of the chamfered portion 3 is defined by the lengths of two sides indicated by the dashed double-dotted lines in FIG. 3. In FIG. 3, the constituent surface of the chamfered portion 3 is the constituent surface of the tooth-bottom chamfered portion 30. In FIG. 3, of the lengths of the aforementioned two sides, the length along the end surface 2e indicates a chamfer amount La in the radial direction of the sintered gear 1 at the tooth-bottom chamfered portion 30. The other length along the tooth bottom surface 20 indicates a chamfer amount Lb in the axial direction of the sintered gear 1 at the tooth-bottom chamfered portion 30.

In detail, the chamfer amount La in the radial direction is a distance between an intersection point Pa and an intersection point Pc, described below. The chamfer amount Lb in the axial direction is a distance between an intersection point Pb and the intersection point Pc below.

The intersection point Pa is an intersection point at which the end surface 2e intersects with the constituent surface of the tooth-bottom chamfered portion 30.

The intersection point Pb is an intersection point at which the tooth bottom surface 20 intersects with the constituent surface of the tooth-bottom chamfered portion 30.

The intersection point Pc is an intersection point at which an imaginary surface 20e that is an extension of the end surface 2e intersects with an imaginary surface 200 that is an extension of the tooth bottom surface 20.

The amount of chamfering is, for example, 0.1 mm to 1.0 mm. Setting the amount of chamfering to 0.1 mm to 1.0 mm means that both the chamfer amount La in the radial direction and the chamfer amount Lb in the axial direction are set to 0.1 mm to 1.0 mm. The chamfer amount La in the radial direction and the chamfer amount Lb in the axial direction may be substantially equal to each other and may differ from each other. When the amount of chamfering is 0.1 mm or more, the edge of the teeth 2 of the sintered gear 1 illustrated in FIG. 1B is effectively prevented from being chipped easily. In chamfering using a brush, the larger the amount of chamfering, the more the machining time is increased. When the amount of chamfering is 1.0 mm or less, the machining time required for chamfering is easily shortened. Consequently, machining costs are also suppressed.

<Surface Property>

Figure 2A:
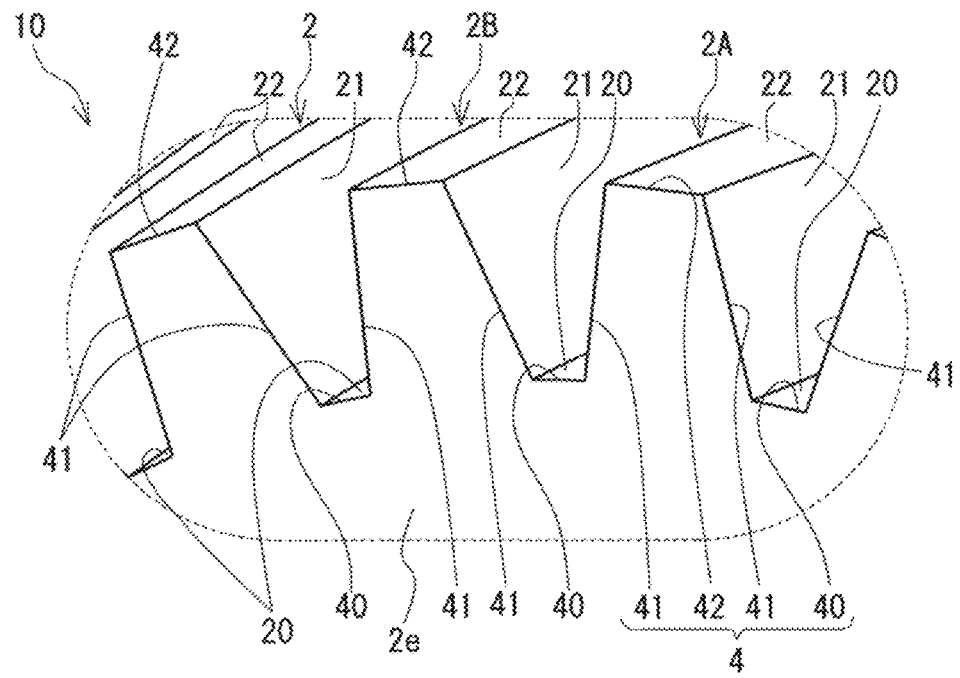
FIG. 2A is an enlarged schematic perspective view illustrating a vicinity of teeth of a gear-shaped green compact before chamfering.

When the chamfered portion 3 is formed by chamfering the edge 4 of the teeth 2 of the green compact 10 illustrated in FIG. 2A in the manufacturing process of the sintered gear 1, the surface of the chamfered portion 3 is relatively rough. Part of particles constituting the green compact 10 are shaved off by chamfering. Therefore, irregularities based on the sizes of the particles are easily generated on a machined surface after chamfering. As a result of the chamfered green compact 10 being sintered, the surface of the chamfered portion 3 of the sintered gear 1 also tends to be rough due to the irregularities.

[Method of Manufacturing Sintered Gear]

<Outline>

A method of manufacturing a sintered gear according to an embodiment will be described with reference to FIG. 2A and FIG. 2B, as appropriate.

The sintered gear 1 can be manufactured by a method of manufacturing a sintered gear according to an embodiment described below. The method of manufacturing according to an embodiment includes the following steps. Chamfering as a second step will be described with reference to FIG. 4 and FIG. 5, as appropriate.

In a first step, the gear-shaped green compact 10 having the plurality of teeth 2 is prepared.

In the second step, the edge 4 of the teeth 2 is chamfered by a brush 100.

In a third step, the chamfered green compact 10 is sintered. Hereinafter, the chamfered green compact 10 is referred to as a machined body 11.

Figure 4:
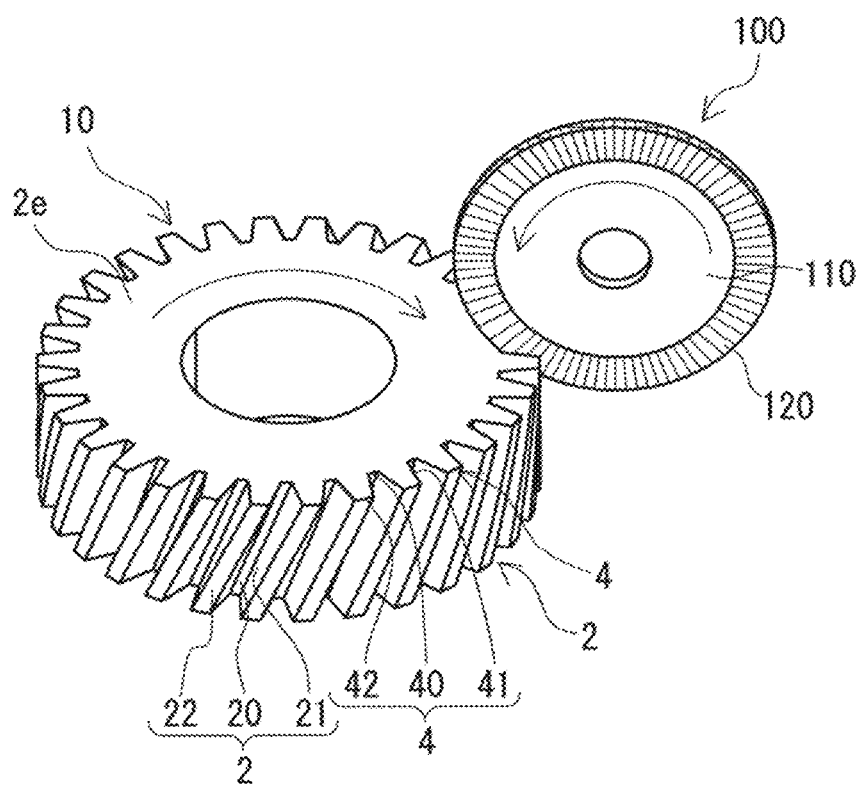
FIG. 4 describes chamfering in a method of manufacturing a sintered gear according to an embodiment.

In the second step, that is, chamfering, the brush 100 illustrated in FIG. 4 is a wheel-type brush. The wheel-type brush includes a disk-shaped wheel 110 and a bristle member 120 that protrudes radially from the outer periphery of the wheel 110.

Hereinafter, each step will be described in detail.

<First Step: Preparation>

In this step, the green compact 10 (FIG. 2A) is prepared. The green compact 10 is produced by, for example, subjecting a green compact having a predetermined shape to gear cutting using a hob or the like. In this case, the shape of the green compact before gear cutting may be a simple shape such as a cylindrical shape. Green compacts having simple shapes are easily compacted with accuracy. Therefore, when the green compact before gear cutting has a simple shape, the green compact in which shape accuracy and dimensional accuracy are high can be efficiently compacted. In addition to cylindrical shapes, the simple shapes include columnar shapes. The excellent compactability of the green compact contributes to an improvement in productivity of the sintered gear 1. The green compact 10 may be compacted using a die assembly.

<<Production of Green Compact>>

A green compact is an aggregate including metal powder as a main component. In detail, a lamp state of the green compact is maintained by particles of the metal powder plastically deformed to be engaged with each other. Such a green compact can be produced by compressing raw material powder including metal powder as a main component. A die assembly having a predetermined shape is filled with the raw material powder to perform compacting of the green compact. Then, the raw material powder is compressed by using a publicly known pressing apparatus, such as a uniaxial pressing apparatus. Typically, the die assembly includes a die having a through hole, and an upper punch and a lower punch that are disposed at upper and lower opening portions of the through hole, respectively. When a cylindrical green compact is to be produced, a core rod that is to be inserted into the through hole may be included.

<<Raw Material Powder>>

The content of the metal powder as the main component of the raw material powder is, for example, 90 mass % or more with respect to 100 mass % of the raw material powder. The content of the metal powder may be 95 mass % or more or, further, 98 mass % or more. The larger the content of the metal powder in the raw material powder, the more easily a dense green compact is obtained. The metal powder here includes powder that is nonferrous element powder used in a later-described iron-based alloy and that is constituted by a nonmetal element.

The composition of the raw material powder is preferably adjusted in accordance with an intended composition of the sintered gear 1. When the sintered gear 1 made of an iron-based alloy is to be manufactured, the powder constituting a green compact includes, for example, first mixed powder constituted by iron powder and nonferrous element powder, second mixed powder constituted by iron-based alloyed powder and nonferrous element powder; or iron-based alloyed powder. In this case, it is possible to manufacture the sintered gear 1 excellent in mechanical properties as described above. For details of the iron-based alloy, the section regarding <Composition> of the sintered gear described above can be referred.

Iron powder is powder that is constituted by pure iron. A representative example of the pure iron is iron that is constituted by Fe and impurities. The content of the impurities in the pure iron is, for example, 1 mass % or less in total. The content of C in the pure iron is 0.02 mass % or less. The nonferrous element powder is powder that is constituted by powder constituted by a nonferrous metal element other than Fe, or powder constituted by a nonmetal element. Examples of the nonferrous metal element are the aforementioned Cu, Ni, Sn, Cr, Mo, Mn, and the like. An example of the nonmetal element is C or the like. For example, when the first mixed powder constituted by iron powder and nonferrous element powder is used, the powder in the stage of a raw material powder is not an iron-based alloy but is alloyed through sintering. Therefore, the sintered gear 1 made of an iron-based alloy can be manufactured. The blending amount of iron powder or iron-based alloyed powder and nonferrous element powder is preferably adjusted to obtain an iron-based alloy having a desired composition. Hereinafter, the iron powder and the iron-based alloyed powder are collectively referred to as iron-based powder. As for the percentages of the iron-based powder and the nonferrous element powder, for example, the percentage of the iron-based powder is 99 mass % or more and the percentage of the nonferrous element powder is 1 mass % or less with the total mass of the iron-based powder and the nonferrous element powder being 100 mass %. The percentage of the iron-based powder may be 99.3 mass % or more, or further, 99.5 mass % or more. The percentage of the nonferrous element powder may be 0.7 mass % or less, or further, 0.5 mass % or less.

The iron-based alloyed powder is powder constituted by an iron-based alloy. When the iron-based alloyed powder is used, the composition of the metal powder contained in the raw material powder and the composition of the sintered gear 1 after sintering are substantially equal to each other.

The iron powder, the powder constituted by nonferrous metal element, and the iron-based alloyed powder that are described above can be manufactured by, for example, a water atomization method, a gas atomization method, a carbonyl method, a reduction method, or the like. As these powders, commercially available powders may be used.

The mean particle diameter of the iron powder and the iron-based alloyed powder is, for example, 10 μm to 200 μm. When the mean particle diameter is 10 m to 200 μm, the powder is easily handled, and the powder is easily compressed. When the mean particle diameter is 10 μm or more, the raw material powder has favorable flowability. It is thus easy to fill a die assembly with the raw material powder. When the mean particle diameter is 200 μm or less, sinterability is excellent. It is thus easy to obtain the sintered gear 1 that is dense. The smaller the mean particle diameter, the more easily the above-described surface roughness is reduced. When the mean particle diameter is 40 μm to 150 μm, an improvement in compactability, an improvement in denseness, an improvement in surface property, and the like can be expected. When a plurality of types of powders are used, the mean particle diameters of the powders may be equal to each other and may differ from each other. The mean particle diameter here is a particle diameter (D50) with which a cumulative volume in a volume particle size distribution measured by a laser-diffraction particle-size-distribution measuring device is 50%.

When a dense green compact is to be produced, it is preferable that the content of the metal powder in the raw material powder be as large as possible, as described above. Therefore, the raw material powder may be substantially metal powder only. Alternatively, at least one of a lubricant and an organic binder may be included in a range in which a dense green compact is obtained.

The dense green compact refers to a green compact having a relative density of 93% or more. When a lubricant is included, burning and the like with the die assembly can be prevented. The content of the lubricant is preferably 0.2 mass % or less with respect to 100 mass % of the raw material powder. When an organic binder is included, generation of chips and cracks of the green compact is easily suppressed in compacting. As the lubricant and the organic binder, publicly known ones are usable. Regarding the lubricant and the organic binder added to the raw material powder, the paragraphs [0040] and [0041] in the description of PTL 1 can be referred.

<<Conditions of Compacting>>

As the die assembly for compacting a green compact, a die assembly with which a green compact having predetermined shape and size can be compacted is preferably selected, as appropriate.

The pressing pressure in compacting is, for example, 600 MPa or more. When the pressing pressure is 600 MPa or more, a green compact is easily densified. The higher the pressing pressure, the more easily the green compact is densified. Therefore, the pressing pressure is preferably 1000 MPa or more, or further, 1500 MPa or more. While the upper limit of the pressing pressure is not particularly set, the upper limit may be set to, for example, 3000 MPa. When the pressing pressure is 3000 MPa or less, damage and the like of the die assembly are easily prevented.

A lubricant is preferably applied to the inner peripheral surface of the die assembly. The inner peripheral surface of the die assembly is, for example, the inner peripheral surface of the above-described die, a pressing surface of a punch, or the like. With the lubricant applied to the die assembly, burning and the like with the die assembly can be prevented, even when the raw material powder contains no lubricant. In addition, due to no lubricant contained in the raw material powder, the content of the metal powder in the raw material powder can be increased. As this lubricant, a publicly known lubricant is usable. Regarding the lubricant applied to the die assembly, the paragraph [0044] in the description of PTL 1 can be referred.

<<Relative Density of Green Compact>>

The relative density of the green compact is preferably 93% or more. The dense green compact whose relative density is 93% or more is excellent in mechanical strength. Therefore, chips, cracks, and the like are not easily generated in the green compact when later-described chamfering, gear cutting, and the other cutting are performed. In other words, with a dense green compact, it is possible to perform machining, such as chamfering, appropriately and possible to reduce generation of defective products. Due to an improvement in yield, it is possible to improve the productivity of the sintered gear 1. In addition, by using a dense green compact, it is possible to manufacture the sintered gear 1 that is dense. The dense sintered gear 1 is, as described, excellent in the mechanical properties and preferable.

The higher the relative density of the green compact, the more excellent the green compact in mechanical strength. Accordingly, the relative density of the green compact is preferably 95% or more, or further, 96% or more, or 97% or more. In order to increase the relative density of the green compact, for example, the content of the metal powder in the raw material powder is increased, the pressing pressure in compacting is increased, metal powder in which fine and coarse powders are mixed is used, or metal powder having a large particle diameter is used.

The relative density of the green compact can be obtained similarly to the relative density of the sintered gear 1 described above. Regarding a method of obtaining the relative density, the section regarding <Relative Density> of the sintered gear described above can be referred. The true density of the green compact can be calculated, for example, from the composition of the green compact, that is, the composition of the raw material powder.

<<Gear Cutting>>

When the green compact 10 is to be produced by gear cutting, a publicly known gear cutting tool is usable in the gear cutting. Representative examples of the gear cutting tool are a hob, a broach, a pinion cutter, and the like. Gear cutting may be performed using a machining center.

Before gear cutting, the following solution may be applied to the surface of the green compact. Alternatively, the surface of the green compact may be immersed in the following solution. Examples of the solution are a volatile solution, a plastic solution, and the like in which an organic binder is dissolved. With the surface of the green compact applied with or immersed in the solution, chips and cracks of the surface layer of the green compact can be suppressed in gear cutting. In some cases, it is expected that chips and cracks can be suppressed also in the next step, which is chamfering. Therefore, application of or immersion in the solution contributes to a reduction of defective products due to chips and cracks. In other words, the yield can be increased. Application of or immersion in the solution may be performed before chamfering, described later, or before cutting other than gear cutting and chamfering.

In addition to gear cutting, the other cutting may be performed with respect to the green compact before chamfering. The cutting may be either milling or turning. A machining center capable of automatically performing a plurality of types of machining may be used. Specific machining is, for example, drilling or the like.

The amount of machining by gear cutting, chamfering, and the other cutting may be adjusted by measuring the dimensions of the sintered gear 1 after sintering and feeding back the measured values. By adjusting the amount of machining in accordance with the measured value, a difference between the actual dimensions of the sintered gear 1 after sintering and designed dimensions is easily reduced. As a result, the machining time of finishing and the like after sintering is easily shortened. This point contributes to an improvement in the productivity of the sintered gear 1.

Machining waste generated in gear cutting, chamfering, and the other cutting is reusable as raw material powder. Here, when the green compact 10 is a material to be cut, machining waste in machining is typically generated as a result of part of particles that constitute the green compact 10 being separated from the green compact 10 and becoming powdery.

Such machining waste is reusable in a state as it is, without being re-dissolved and re-solidified, as raw material powder. When a particle lump formed by solidified particles is present in the machining waste, the particle lump may be disintegrated, as appropriate.

In addition, a green compact in which a chip or a crack is generated in the above-described machining is also reusable as raw material powder by being disintegrated, as appropriate, into powder. As described above, when a green compact is a material to be cut, machining waste and defective products are easily reusable compared with when a sintered material is a material to be cut. This point contributes to a reduction in material costs. In addition, since the machining waste is powdery, the machining waste can be easily removed from the green compact by using an air blower or the like. Further, by using an air blower to remove machining waste, the green compact is not easily damaged during removal of the machining waste. Since generation of defective products due to damage can be reduced, the yield can be increased. In other words, removal of machining waste by an air blower contributes to an improvement in the productivity of the sintered gear 1.

<Second Step: Chamfering>

In this step, the edge 4 of the teeth 2 of the green compact 10 illustrated in FIG. 2A is chamfered by the brush 100 illustrated in FIG. 4. The machined body 11 illustrated in FIG. 2B is then produced. As illustrated in FIG. 2A, the edge 4 includes a tooth bottom edge 40, a tooth surface edge 41, and a tooth tip edge 42. The tooth bottom edge 40 is an edge constituted by the end surface 2e of the green compact 10 and the tooth bottom surface 20. The tooth surface edge 41 is an edge constituted by the end surface 2e and the tooth surface 21. The tooth tip edge 42 is an edge constituted by the end surface 2e and the tooth tip surface 22. The brush 100 illustrated in FIG. 4 is a wheel-type brush.

<<Machined Body>>

The machined body 11 has a shape substantially equal to the shape of the sintered gear 1. The machined body 11 illustrated in FIG. 2B is a helical external gear as with the sintered gear 1. The machined body 11 has a pair of the end surfaces 2e and a plurality of the teeth 2 provided on the outer peripheral surface thereof. The machined body 11 also includes the chamfered portion 3 at a corner portion between each end surface 2e and the constituent surface of the teeth 2, the constituent surface including the tooth bottom surface 20, the tooth surface 21, and the tooth tip surface 22.

The chamfered portion 3 includes the tooth-bottom chamfered portion 30, the tooth-surface chamfered portion 31, and the tooth-tip chamfered portion 32.

The relative density of the machined body 11 is substantially equal to the relative density of the green compact 10 before chamfering. With the dense machined body 11 whose relative density is 93% or more, it is possible to manufacture the sintered gear 1 that is dense.

In addition, when the machined body 11 is dense, shrinkage thereof in sintering is likely to be uniform. It is thus easy to reduce a difference between the shape and dimensions of the machined body 11 and the shape and dimensions of the sintered gear 1. As a result, the machining time of finishing and the like after sintering is easily shortened. This point contributes to an improvement in the productivity of the sintered gear 1.

<<Brush>>

The brush 100 used for chamfering is a wheel-type brush. As illustrated in FIG. 4, the wheel-type brush includes the wheel 110 and the bristle member 120. The wheel 110 has a disk shape and has end surfaces provided one each on two sides in the axial direction and each having a circular shape in plan view. A through hole for attaching a rotary shaft may be provided at a center portion of the wheel 110 to extend along the center axis. The bristle member 120 is provided on the outer periphery of the wheel 110 to protrude radially from the outer peripheral surface of the wheel 110. The rotary shaft is attached to the brush 100 at the center axis of the wheel 110. The rotary shaft rotates to thereby rotate the brush 100. That is, the brush 100 rotates about the axis of the wheel 110. The rotation of the brush 100 causes the bristle member 120 to come into contact with the green compact 10 to thereby shave off the edge 4.

<<Bristle Member>>

The bristle member 120 is constituted by a plurality of flexible fibers. The fibers constituting the bristle member 120 are, for example, resin fibers, metal fibers, or the like. The material of the resin fibers is, for example, polyether ether ketone, polyamide (nylon), or the like. The material of the metal fibers is, for example, iron, steel, stainless steel, or the like. When resin fibers are employed, the resin fibers may contain abrasive grains. The abrasive grains are, for example, ceramic abrasive grains or the like. The material of the ceramic abrasive grains is, for example, silicon carbide (SiC), silicon nitride ($Si_3N_4$), alumina ($Al_2O_3$), or the like. Abrasive-grain-contained resin fibers have both flexibility and rigidity in a favorable balance. That is, with the abrasive-grain-contained resin fibers, the bristle member 120 can come into contact with the edge 4 sufficiently due to the flexibility of the resin fibers. In addition, in the abrasive-grain-contained resin fibers, the abrasive grains are exposed from the surfaces of the fibers, and the edge 4 can be efficiently shaved off by the abrasive grains. Therefore, when the bristle member 120 is constituted by abrasive-grain-contained resin fibers, it is possible to efficiently chamfer the edge 4.

The sectional shape of each fiber constituting the bristle member 120 is typically circular. The fiber diameter is preferably selected, as appropriate, in accordance with the material and the like of the fibers. The diameter of each fiber is, for example, 0.5 mm to 3.0 mm. When abrasive-grain-contained resin fibers are employed, yarn count indicating the particle size of each abrasive grain is preferably selected, as appropriate, in accordance with the fiber diameter and the like. The yarn count indicating the particle size of each abrasive grain is, for example, #60 to #325. The content of the abrasive grains in the abrasive-grain-contained resin fibers is, for example, 15 mass % to 40 mass %. The larger the content of the abrasive grains, the more the grinding force of the bristle member 120 increases. It is thus possible to efficiently chamfer the edge 4. The smaller the content of the abrasive grains, the more the flexibility of the bristle member 120 increases. It is thus possible to reduce damage to the green compact 10.

Figure 6:
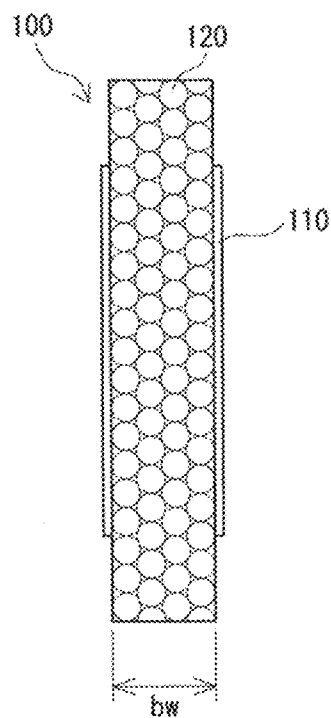
FIG. 6 is a schematic side view of a wheel-type brush.

FIG. 6 is a side view schematically illustrating a state in which the brush 100 illustrated in FIG. 4 is viewed in a direction orthogonal to the axial direction of the wheel 110. A width bw of the bristle member 120 is, for example, larger than an interval, that is, a pitch between mutually adjacent teeth 2 illustrated in FIG. 2A and FIG. 4. The width bw of the bristle member 120 is a dimension in the axial direction of the wheel 110. The width bw of the bristle member 120 here is the width of the tip side of the bristle member 120, that is, the outer peripheral side of the brush 100. With the width bw of the bristle member 120 being larger than the interval between the mutually adjacent teeth 2, it is possible to efficiently chamfer the edge 4. The interval between the teeth 2 is a distance between the teeth 2 adjacent to each other on a reference circle. This distance is defined as a reference pitch. The diameter of the reference circle can be obtained by [module×the number of teeth]. The interval between the teeth 2, that is, the reference pitch can be obtained by [circumference of the reference circle/the number of teeth]. The larger the width bw of the bristle member 120 to some extent, the more the edge 4 can be chamfered at the same time. It is thus possible to more efficiently chamfer the edge 4.

The width bw of the bristle member 120 is preferably larger than the interval between mutually adjacent teeth. The interval between the teeth is a distance between the teeth 2 adjacent to each other on a tooth-tip circle. Further, the width bw of the bristle member 120 may be 1.5 times or more or twice or more the interval between the teeth 2, that is, the reference pitch. The upper limit of the width bw of the bristle member 120 is not particularly limited. However, when the width bw of the bristle member 120 is excessively increased, a portion that does not come into contact with the green compact 10 is generated. This portion does not contribute to chamfering. The upper limit of the width bw of the bristle member 120 is, for example, 10 times or less, or further, 8 times or less the interval of the mutually adjacent teeth 2.

In the brush 100, the length of the bristle member 120 is, for example, 10 mm to 60 mm, or further, 15 mm to 50 mm. The length of the bristle member 120 here is the amount of protrusion from the outer peripheral edge of the wheel 110. When the length of the bristle member 120 is 10 mm to 60 mm, the bristle member 120 can have appropriate firmness and suppleness.

<<Conditions of Chamfering>>

The chamfering by the brush 100 is performed by the following method.

(i) As illustrated in FIG. 4, the brush 100 is disposed with respect to the green compact 10 such that the axial direction of the green compact 10 intersects with the axial direction of the wheel 110.

Figure 5:
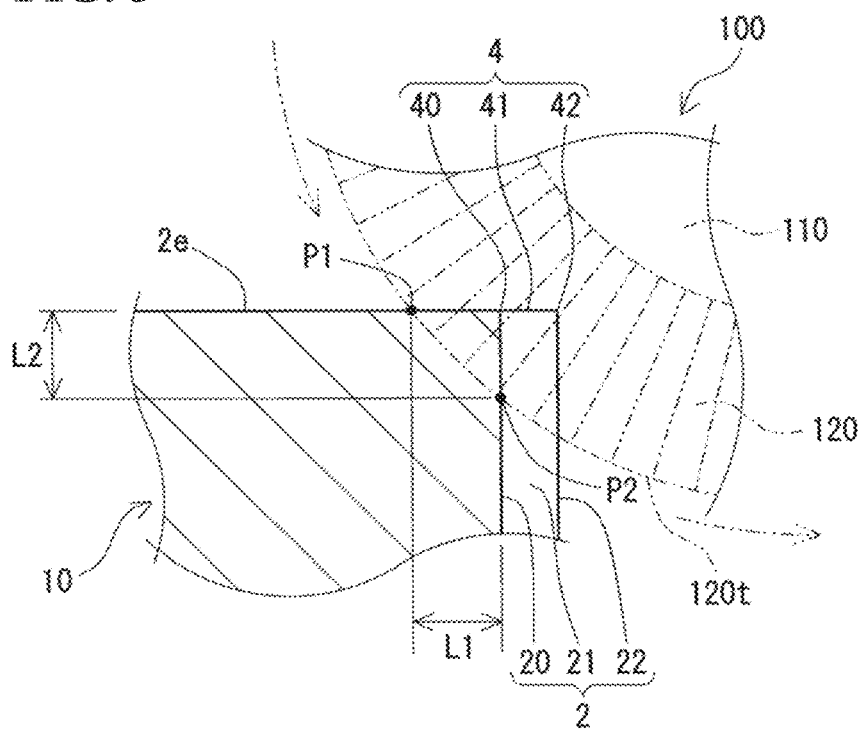
FIG. 5 describes the amount of cutting of a green compact by a brush in chamfering.

(ii) As illustrated in FIG. 5, with the brush 100 being seen in the axial direction of the wheel 110, the tip of the bristle member 120 is brought into contact with the tooth bottom edge 40.

(iii) As illustrated in FIG. 4, the brush 100 is relatively moved in the circumferential direction of the green compact 10 while being rotated, that is, rotated about the axis of the wheel 110.

When chamfering is performed by the aforementioned method, the edge 4 is shaved off as a result of the bristle member 120 coming into contact with the edge 4 in response to the rotation of the brush 100. Then, the brush 100 shaves off the edge 4 sequentially by relatively moving in the circumferential direction of the green compact 10. Through chamfering by shaving off the edge 4, the chamfered portion 3 illustrated in FIG. 2B is formed. When chamfering is performed by the brush 100, the constituent surface of the chamfered portion 3 is likely to be formed into a curved surface. On the surface of the green compact 10, scratches in a fine stripe form are generated on a portion with which the bristle member 120 has been in contact.

As illustrated in FIG. 5, when the brush 100 is rotated, an imaginary peripheral edge 120*t* of the tip of the bristle member 120 substantially coincides with the rotational trajectory of the tip of the bristle member 120. When the bristle member 120 is caused to come into contact with the green compact 10 by rotating the brush 100, the bristle member 120 elastically deforms. This is because the bristle member 120 has flexibility. It is thus easy, even when the rotation speed of the brush 100 is increased to some extent, to prevent the green compact 10 from being chipped and from being excessively shaved locally. In other words, even when the machining speed is increased, the edge 4 can be appropriately chamfered. With the machining speed that can be increased, it is possible to shorten the machining cycle time. This point contributes to an improvement in the productivity of the sintered gear 1.

In addition, by performing chamfering by the aforementioned method, the bristle member 120 is easily inserted into spaces between the teeth 2 adjacent to each other. Therefore, the edge 4 including all of the tooth bottom edge 40, the tooth surface edge 41, and the tooth tip edge 42 can be favorably chamfered. It is thus possible to favorably chamfer the edge 4.

Further, by performing chamfering by the aforementioned method, the bristle member 120 can be brought into contact with, of the end surfaces 2*e* of the green compact 10, only the teeth 2 and the vicinity of the teeth 2. In other words, it is possible to significantly prevent, of the end surfaces 2*e* of the green compact 10, a region positioned radially inside from the tooth bottom surface 20 from being shaved off by the bristle member 120. Therefore, most of the end surfaces 2*e* of the green compact 10 is not machined and can be maintained in a state before machining. Accordingly, the flatness of the end surfaces 2*e* of the green compact 10 is easily maintained.

As a result of the flatness of the end surfaces 2*e* of the green compact 10 being maintained, the flatness of the end surfaces 2*e* of the sintered gear 1 illustrated in FIG. 1A and FIG. 1B is also maintained properly.

As long as the axial direction of the green compact 10 and the axial direction of the wheel 110 have at least a relationship in which the axial directions intersect with each other, these axial directions may be, for example, orthogonal to each other and may have a relationship in which the two axial directions are not orthogonal or parallel to each other. The direction in which the wheel 110 is disposed is changeable, as appropriate, in accordance with the direction of the edge 4.

Hereinafter, more preferable conditions of chamfering will be described.

(Amount of Cutting)

With reference to FIG. 5, the amount of cutting by the brush 100 in chamfering will be described. FIG. 5 is a partial sectional view schematically illustrating a state that is cut along a plane passing through the center axis of the green compact 10 and passing an intermediate portion of the tooth bottom edge 40 in the circumferential direction. The amount of cutting with respect to the green compact 10 by the brush 100 includes a cutting amount L1 in the radial direction and a cutting amount L2 in the axial direction. The cutting amount L1 in the radial direction is a distance in the radial direction of the green compact 10 from the tooth bottom edge 40 to an intersection point P1 at which the imaginary peripheral edge 120*t* of the bristle member 120 intersects with the end surface 2*e* of the green compact 10. The cutting amount L2 in the axial direction is a distance in the axial direction of the green compact 10 from the tooth bottom edge 40 to an intersection point P2 at which the imaginary peripheral edge 120*t* of the bristle member 120 intersects with the tooth bottom surface 20.

The cutting amount L1 in the radial direction is set to, for example, 0.3 mm to 2 mm, or further, 0.5 mm to 1.5 mm, and the cutting amount L2 in the axial direction is set to, for example, 0.3 mm to 2 mm, or further, 0.5 mm to 1.5 mm. With the cutting amount L1 in the radial direction and the cutting amount L2 in the axial direction being set within the aforementioned ranges, it is possible to chamfer the edge 4 of the teeth 2 favorably. For example, by setting the cutting amount L1 in the radial direction to 0.3 mm or more and setting the cutting amount L2 in the axial direction to 0.3 mm or more, it is possible to cause the amount of chamfering at the edge 4 of each of the teeth 2 to be, for example, 0.1 mm or more, or further, 0.2 mm or more. By setting the cutting amount L1 in the radial direction to 2 mm or less and setting the cutting amount L2 in the axial direction to 2 mm or less, it is possible to machine only the teeth 2 and the vicinity of the teeth 2. In other words, portions other than the vicinity of the teeth 2 can be prevented from being machined. In particular, when the cutting amount L1 in the radial direction is set to 2 mm or less, most of the end surfaces 2*e* of the green compact 10 is allowed to be not machined. Therefore, the state of the end surfaces 2*e* can be maintained.

(Amount of Chamfering)

Here, the amount of chamfering at the edge 4 of each of the teeth 2 is, for example, 0.1 mm to 1.0 mm, or further, 0.2 mm to 0.8 mm. The amount of chamfering of the edge 4 here means the amount of chamfering of each of the tooth bottom edge 40, the tooth surface edge 41, and the tooth tip edge 42. When the amount of chamfering of the edge 4 is 0.1 mm to 1.0 mm, it is meant that the amounts of chamfering of all of the tooth bottom edge 40, the tooth surface edge 41, and the tooth tip edge 42 are within the aforementioned range. With the amount of chamfering of the edge 4 being within the aforementioned range, the edge of the sintered gear 1 is effectively prevented from being chipped easily. For details of the amount of chamfering, the section regarding <Amount of Chamfering> of the sintered gear described above can be referred.

(Rotation Direction of Brush)

An example of the rotation direction of the brush 100 is a direction from each end surface 2*e* of the green compact 10 toward the tooth bottom surface 20 or a direction from the tooth bottom surface 20 toward the end surface 2*e* of the green compact 10. The direction from the end surface 2*e* of the green compact 10 toward the tooth bottom surface 20 is a direction in which the tip of the bristle member 120 moves from the end surface 2*e* of the green compact 10 so as to pass the tooth bottom surface 20. The direction from the tooth bottom surface 20 to the end surface 2*e* of the green compact 10 is a direction in which the tip of the bristle member 120 moves from the tooth bottom surface 20 so as to pass the end surface 2*e*. As indicated by the arrows in FIG. 4 and FIG. 5, when the brush 100 is rotated such that the tip of the bristle member 120 moves from the end surface 2e so as to pass the tooth bottom surface 20, the edge 4 can be more efficiently chamfered.

(Rotation Speed of Brush)

The rotation speed of the brush 100 is set to, for example, 200 m/min to 800 m/min. or further, 220 m/min to 750 m/min. By setting the rotation speed of the brush 100 to 200 m/min or more, the machining cycle time can be shortened. By setting the rotation speed of the brush 100 to 800 m/min or less, damage to the green compact 10 and to the bristle member 120 due to the bristle member 120 coming into contact with the green compact 10 can be reduced. The rotation speed (m/min) of the brush 100 can be obtained by [π×D×N/1000]. D is the diameter (mm) of the brush 100. N is the number of rotations per minute (rpm) of the brush 100. The diameter of the brush 100 is equal to the diameter of the imaginary peripheral edge 120t of the bristle member 120, that is, the diameter of rotational trajectory of the tip of the bristle member 120.

(Method of Moving Brush)

Examples of a method of relatively moving the brush 100 in the circumferential direction of the green compact 10 are a method in which the green compact 10 is caused to rotate on its axis, that is, rotate about the axis of the green compact 10, and a method in which the brush 100 is caused to revolve about the green compact 10. Causing the brush 100 to revolve means moving the position of the brush 100 in the circumferential direction of the green compact 10. Either one or both of causing the green compact 10 to rotate on its axis and causing the brush 100 to revolve may be performed. By causing the green compact 10 to rotate on its axis, the brush 100 can be moved in the circumferential direction of the green compact 10 in a state in which the position of the brush 100 is fixed. When the green compact 10 is caused to rotate on its axis, control is easier than when the brush 100 is caused to revolve. When the green compact 10 is caused to rotate on its axis, the rotation direction of the green compact 10 is not particularly limited. The relative moving speed of the brush 100 with respect to the green compact 10 corresponds to the feeding speed of the brush 100.

(Others)

Chamfering of the edge 4 is required to be performed not only on the side of one of the end surfaces 2e of the green compact 10 but also on the side of the other end surface. In FIG. 4, the one of the end surfaces 2e is the end surface on the upper side, and the other end surface is the end surface, which is hidden and not seen, on the lower side. Regarding chamfering, the brush 100 is disposed, for example, on each of two sides, which are the side of one of the end surfaces 2e and the side of the other end surface, to perform chamfering. Alternatively, after chamfering on the side of one of the end surfaces 2e is performed, the green compact 10 may be turned over to perform chamfering on the side of the other end surface 2e. When chamfering is performed with the brush 100 disposed with respect to each of the end surfaces 2e on the two sides, the edge 4 of the two sides can be chamfered at the same time. It is thus possible to shorten the machining cycle time.

<Third Step: Sintering>

Figure 2B:
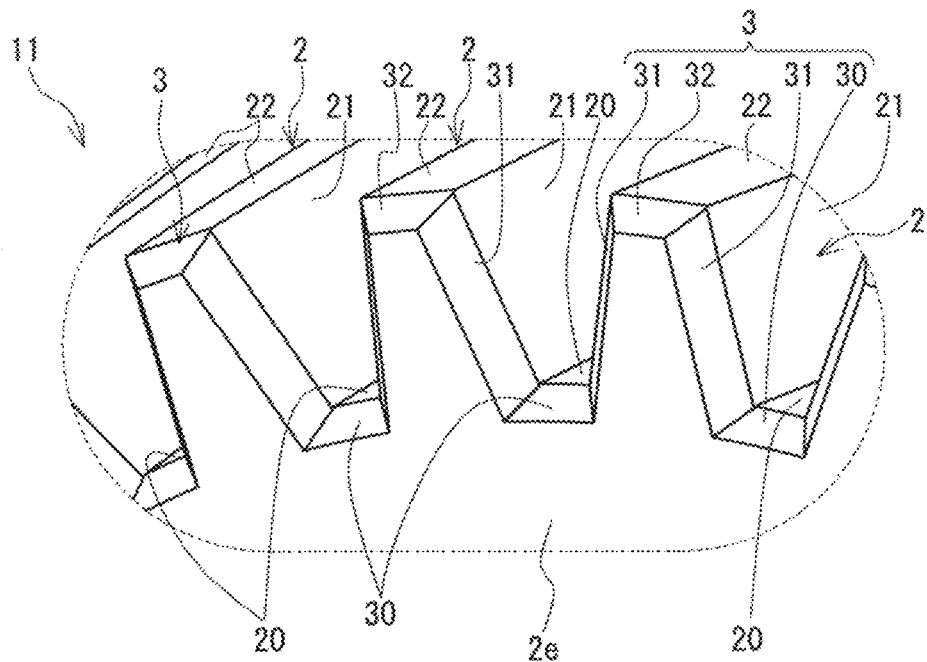
FIG. 2B is an enlarged schematic perspective view illustrating a vicinity of teeth of a gear-shaped green compact after chamfering.

In this step, the chamfered green compact 10, that is, the machined body 11 illustrated in FIG. 2B is sintered. By sintering the machined body 11, the sintered gear 1 including the chamfered portion 3 at the teeth 2, as illustrated in FIG. 1B, is obtained.

Conditions of sintering of the machined body 11 are preferably adjusted, as appropriate, in accordance with the composition of the raw material powder. As the conditions of sintering, publicly known conditions of sintering are applicable. When the sintered gear 1 made of an iron-based alloy is to be manufactured, conditions of sintering are, for example, as follows.

The sintering temperature is, for example, 1000° C. to 1400° C. Further, the sintering temperature may be 1100° C. to 1300° C.

The sintering time is, for example, 10 minutes to 150 minutes. Further, the sintering time may be 15 minutes to 60 minutes.

<Other Steps>

Examples of the other steps are a step of subjecting the sintered gear to cementation after sintering, a step of subjecting the sintered gear to gear grinding after cementation, and the like. For conditions of the cementation, conditions of the gear grinding, and the like, publicly known conditions can be referred.

The method of manufacturing the sintered gear according to the embodiment provides the following effects.

(A) It is possible to manufacture the sintered gear 1 with favorable productivity. The gear-shaped green compact 10 is chamfered by the brush 100. The bristle member 120 of the brush 100 has flexibility. It is thus easy, even when the rotation speed of the brush 100 is increased to some extent, to prevent the green compact 10 from being chipped and from being excessively shaved locally. Therefore, even when the machining speed is increased, the edge 4 can be chamfered appropriately. With the machining speed that can be increased, it is possible to shorten the machining cycle time.

(B) It is possible to chamfer the edge 4 favorably. The bristle member 120 is easily inserted into spaces between teeth 2 adjacent to each other. Therefore, the edge 4 including all of the tooth bottom edge 40, the tooth surface edge 41, and the tooth tip edge 42 can be favorably chamfered.

(C) It is possible to appropriately maintain the flatness of the end surfaces 2e. The bristle member 120 can be brought into contact with, of the end surfaces 2e of the green compact 10, only the teeth 2 and the vicinity of the teeth 2. In other words, it is possible to significantly prevent, of the end surfaces 2e of the green compact 10, a region positioned radially inside from the tooth bottom surface 20 from being shaved off by the bristle member 120. Therefore, most of the end surfaces 2e of the green compact 10 is not machined and can be maintained in a state before machining. Therefore, as a result of the flatness of the end surfaces 2e of the green compact 10 being maintained, the flatness of the end surfaces 2e of the sintered gear 1 is also maintained properly. For example, in gear grinding of the sintered gear 1, the gear grinding can be favorably performed by using the end surfaces 2e of the sintered gear 1 as reference surfaces.

In addition, the method of manufacturing the sintered gear according to the embodiment is expected to provide the following effects.

(a) It is possible in cementation after sintering to perform, typically, the sintering and the cementation successively. Therefore, it is possible to eliminate the need to replace a material into a heat treatment furnace, rearrange a material, and the like. Since this replacement work can be omitted, the manufacturing time can be shortened.

(b) Substantially no burr is generated. Therefore, burr removing work is unnecessary. Chamfering by the brush 100 can be said to be machining in which part of particles constituting the green compact 10 is shaved off.

Therefore, burrs due to plastic deformation of the material during machining are not generated substantially. Since the burr removing work can be omitted, the manufacturing time can be shortened. When a molten material or a sintered material is subjected to cutting, burrs due to plastic deformation of the material during cutting are generated. When burrs are generated, burr removing work is necessary.

(c) It is possible to easily remove machining waste in chamfering by an air blower or the like since the machining waste is mainly powdery. Therefore, machining waste can be easily removed in a short time. In other words, a time of removing machining waste can be short. In addition, the air blower does not easily damage the green compact 10 during removal of machining waste. It is possible to improve the productivity of the sintered gear 1 in terms of being able to reduce generation of defective products due to damage.

(d) The green compact 10 is easily machined compared with a molten material and a sintered material since the green compact 10 before sintering is merely powder that has been solidified through compression molding. In other words, machining resistance of the brush with respect to the green compact 10 that is a material to be shaved is smaller than cutting resistance with respect to a molten material or a sintered material. Therefore, the life of the brush 100 can be extended. When a large quantity of sintered gears 1 are successively manufactured, replacement frequency of the brush 100 can be reduced. Therefore, a total time required for replacement of the brush 100 in mass production of the sintered gear 1 is reduced.

(e) The green compact 10 before sintering is superior in cutting machinability to a sintered material. It is thus possible to increase the machining speed of gear cutting and the like. Therefore, the machining time for gear cutting and the like is easily reduced.

Test Example 1

A sintered gear was produced. Regarding the produced sintered gear, a chamfered state after chamfering of an edge of each of the teeth was evaluated.

As the sintered gear, a helical external gear made of an iron-based alloy was produced. Specifications of the gear are as follows.

<Specifications>
Outer diameter: 45 mm, inner diameter: ϕ20 mm, height: 20 mm
Module: 1.4
The number of teeth: 29
Pressure angle: 17.5°
Torsion angle: 15.8°
Teeth Interval, that is, reference pitch: 4.87 mm
The sintered gear was produced as follows.

As a raw material powder, mixed powder of iron-based powder and carbon powder was prepared. The iron-based powder has a composition in which Ni is 1.9 mass %. Mn is 0.2 mass %, Mo is 0.55 mass %, and the balance is Fe. The mean particle diameter (D50) of the iron-based powder is 42 μm. The mean particle diameter (D50) of the carbon powder is 8 sm. The blending ratio of the iron-based powder and the carbon powder is 99.7:0.3 in terms of the mass ratio. With a die assembly filled with the mixed powder, a cylindrical green compact was produced by a uniaxial pressing apparatus. The pressing pressure was 2000 MPa. The density of the green compact was 7.7 g/cm3. The relative density of the green compact was 98.7%.

The produced cylindrical green compact was subjected to gear cutting to thereby produce a gear-shaped green compact that satisfies the above-described specifications. A publicly known gear hobbing machine was used for the gear cutting.

This gear cutting did not cause chips, cracks, and the like in the green compact. The machining waste was powdery.

Regarding the gear-shaped green compact, an edge of each of the teeth was chamfered under respective conditions for tests A, B, and C described below.

<Test A>
In the test A, a wheel-type brush was used. The width of the bristle member was 10 mm. The length of the bristle member was 35 mm. The diameter of the brush was 200 mm. The fibers constituting the bristle member of the brush was abrasive-grain-contained resin fibers. The material of the resin fibers was polyether ether ketone. The material of the abrasive grains was SiC. The fiber diameter was about 0.5 mm. The yarn count indicating the particle size of each abrasive grain was #120.

Chamfering by the brush was performed as follows.

The wheel-type brush was disposed with respect to the green compact such that respective axial directions were orthogonal to each other. With the wheel-type brush being seen in the axial direction, the tip of the bristle member was brought into contact with the tooth bottom edge. While the brush was rotated, the green compact was caused to rotate on its axis. Here, chamfering of the edge of the teeth was performed by rotating the green compact once in one direction.

Regarding the amount of cutting by the brush, the cutting amount in the radial direction was set to 1 mm, and the cutting amount in the axial direction was set to 1 mm. The rotation direction of the brush was a direction in which the tip of the bristle member moves from an end surface so as to pass the tooth bottom surface of the green compact. The rotation speed of the brush was set to 376 m/min.

The green compact was adjusted to rotate once in 10 seconds. The feeding speed of the brush can be obtained by [circumference of green compact/time required for one rotation of green compact]. The feeding speed obtained by assuming that the outer diameter of the green compact was 45 mm and the time required for one rotation of the green compact was 10 seconds was 850 mm/min.

Figure 7:
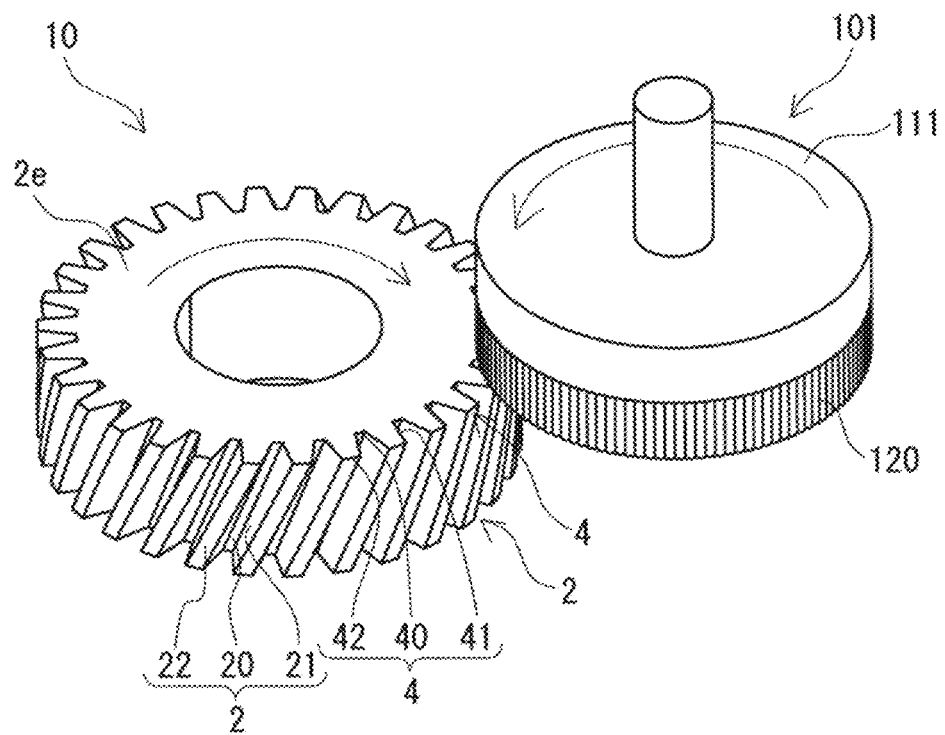
FIG. 7 describes chamfering in a test B.
Figure 8:
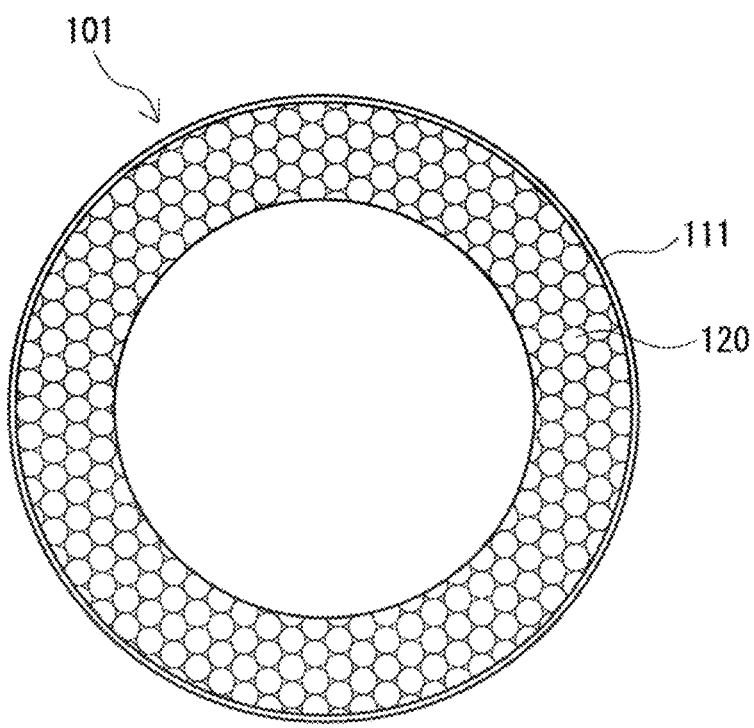
FIG. 8 is a schematic bottom view of a cup-type brush.
Figure 9:
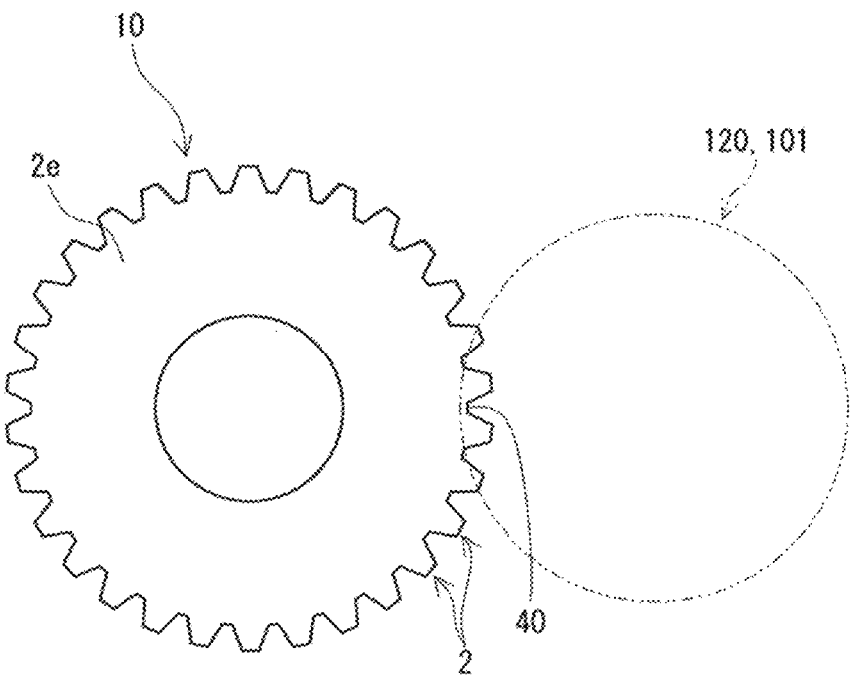
FIG. 9 is a schematic top view describing an arrangement of a brush in the test B.

<Test B>
In the test B, a cup-type brush was used. With reference to FIG. 7 to FIG. 9, chamfering in the test B will be described. A brush 101 illustrated in FIG. 7 is a cup-type brush. As illustrated in FIG. 7, the bristle member 120 of the cup-type brush protrudes from an open end of a cylindrical cup 111 in the axial direction. A rotary shaft is attached to the brush 101 at the center of an end surface of the cup 111. The brush 101 is rotated, that is, rotated about the axis of the cup 111 by the rotary shaft. Here, as illustrated in FIG. 8, the bristle member 120 is disposed in a cylindrical form. The length of the bristle member 120 protruding from the open end of the cup 111 in the axial direction, that is, the protruding amount is 35 mm. The fibers constituting the bristle member 120 are abrasive-grain-contained resin fibers, as in the test A.

When chamfering is performed by using the cup-type brush, as illustrated in FIG. 7, the brush 101 is disposed with respect to the green compact 10 such that the axial direction of the green compact 10 and the axial direction of the cup 111 are parallel to each other. With the brush 101 being seen in the axial direction, the bristle member 120 is brought into contact with the end surface 2e of the green compact 10 such that the tip of the bristle member 120 overlaps the edge 4. Then, while the brush 101 is rotated, the brush 101 is relatively moved in the circumferential direction of the green compact 10. Here, the green compact 10 was caused to rotate on its axis.

As illustrated in FIG. 9, the brush 101 was disposed such that, with the green compact 10 being seen in the axial direction, the outer peripheral edge of the bristle member 120 was positioned radially inside from the tooth bottom edge 40 by 1 mm at the end surface 2e of the green compact 10. The amount of cutting by the brush 101 was set to 1 mm. The rotation speed of the brush 101 was set to 376 m/min.

The green compact was adjusted to rotate once in 10 seconds. In other words, the feeding speed of the brush was 850 mm/min.

In the test B, the rotation direction of the brush was reversed after the green compact was rotated once in one direction. Then, the green compact was rotated once more, and chamfering of the edge of the teeth was performed.

<Test C>

Figure 10:
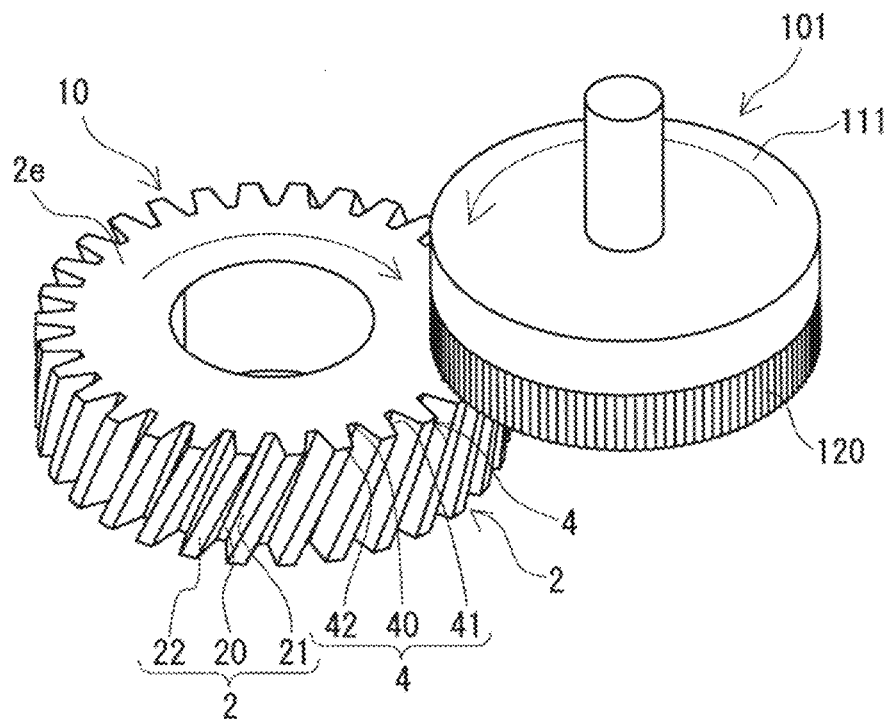
FIG. 10 describes chamfering in a test C.
Figure 11:
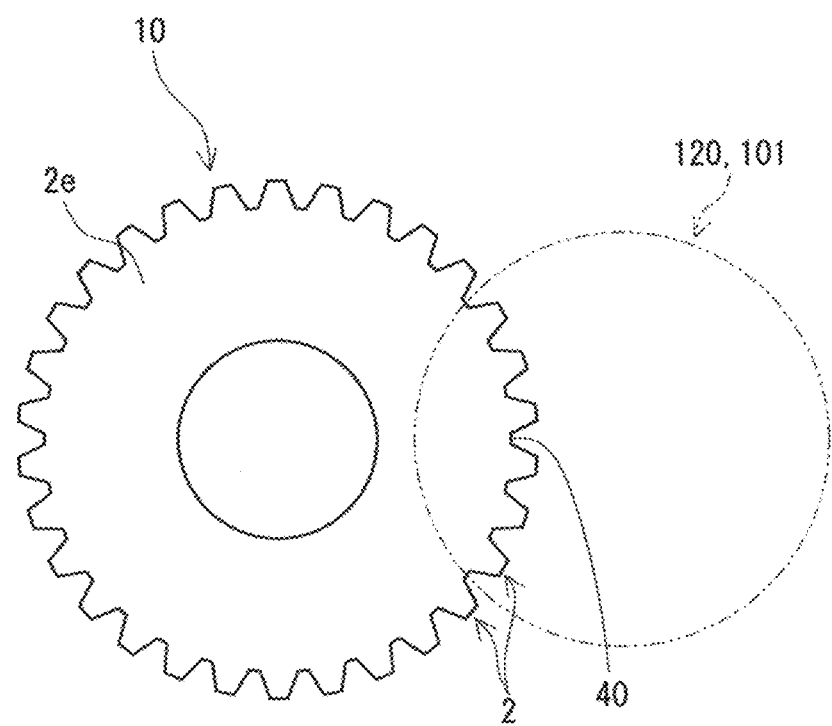
FIG. 11 is a schematic top view describing an arrangement of a brush in the test C.

In the test C, chamfering was performed by using the same cup-type brush as in the test B. In the test C, as illustrated in FIG. 10 and FIG. 11, the arrangement of the brush 101 was changed. The other conditions for performing the chamfering were the same as those for the test B. In the test C, as illustrated in FIG. 11, with the green compact 10 being seen in the axial direction, the outer peripheral edge of the bristle member 120 is positioned radially inside from the tooth bottom edge 40 by 5 mm at the end surface 2e of the green compact 10.

Regarding the green compacts chamfered under the respective conditions for the tests A, B, and C, the chamfer amounts La and Lb (refer to FIG. 3) of each of the chamfered portions at the tooth bottom edge, the tooth surface edge, and the tooth tip edge were measured. Results of the measurement are indicated in Table 1.

In addition, the surface properties of the end surfaces of the green compacts after chamfering were evaluated. The surface properties were evaluated as A when, on the end surfaces, machining scratches by the brush were not present in a region positioned radially inside from the tooth bottom surface by 2 mm or more and evaluated as B when machining scratches were present in the region. Results of the evaluation are indicated in Table 1.

TABLE 1

|  | Tooth-bottom chamfered portion | | Tooth-surface chamfered portion | | Tooth-tip chamfered portion | | |
| --- | --- | --- | --- | --- | --- | --- | --- |
|  | La (mm) | Lb (mm) | La (mm) | Lb (mm) | La (mm) | Lb (mm) | Surface property |
| Test A | 0.3 | 0.3 | 0.3 | 0.3 | 0.3 | 0.3 | A |
| Test B | 0.05 | 0.05 | 0.2 | 0.2 | 0.3 | 0.3 | A |
| Test C | 0.3 | 0.3 | 0.2 | 0.2 | 0.3 | 0.3 | B |

As indicated in Table 1, the amount of chamfering of each chamfered portion was 0.3 mm in the test A. In addition, almost no machining scratches were recognized on the end surfaces in the test A. The end surfaces after chamfering were maintained to be flat surfaces.

In contrast, the amount of chamfering of the tooth-bottom chamfered portion was 0.05 mm, which is small, in the test B. This is considered because the tip of the bristle member was not easily inserted into the spaces between the teeth and was not able to chamfer the tooth bottom edge sufficiently in the test B.

In the test C, most of the end surfaces was machined. Therefore, the end surfaces after chamfering were not maintained to be flat surfaces.

The green compact chamfered under the conditions in the test A was sintered. As conditions of the sintering, the sintering temperature was set to 1150° C. and the sintering time was set to 20 minutes. A sintered gear obtained through sintering included a chamfered portion at an edge of each of the teeth. At the chamfered portion of the sintered gear, the chamfered portion of the green compact was substantially maintained.

The present invention is not limited to these examples and is indicated by the claims. The present invention is intended to include all of modifications within the significance and the scope equivalent to the claims.

For example, in the test 1, the composition of the sintered gear, that is, the composition of the raw material powder, the specifications of the gear, the conditions of chamfering of the edge of the teeth, and the like can be changed, as appropriate.

REFERENCE SIGNS LIST 1 sintered gear
10 green compact
11 machined body
2 teeth
2c outer peripheral surface
2e end surface
2h through hole
20 tooth bottom surface
21 tooth surface
22 tooth tip surface
200, 20e imaginary surface
3 chamfered portion
30 tooth-bottom chamfered portion
31 tooth-surface chamfered portion
32 tooth-tip chamfered portion
4 edge
40 tooth bottom edge
41 tooth surface edge
42 tooth tip edge
100 brush (wheel-type brush)
101 brush (cup-type brush)
110 wheel
111 cup
120 bristle member
120t imaginary peripheral edge
La chamfer amount in radial direction
Lb chamfer amount in axial direction
Pa, Pb, Pc intersection point
L1 cutting amount in radial direction
L2 cutting amount in axial direction
P1, P2 intersection point
bw width

The invention claimed is:

1. A method of manufacturing a sintered gear, the method comprising:

preparing a green compact having two gear-shaped end surfaces, one on each of two sides in an axial direction of the green compact, and having a plurality of teeth on an outer peripheral surface formed between the two end surfaces;

chamfering an edge of the teeth by a brush, the edge being constituted by the end surfaces and the outer peripheral surface; and sintering the green compact that has been chamfered, wherein powder constituting the green compact includes first mixed powder constituted by iron powder and nonferrous element powder, second mixed powder constituted by iron-based alloyed powder and nonferrous element powder, or iron-based alloyed powder, wherein the edge includes all of a tooth bottom edge, a tooth surface edge, and tooth tip edge, wherein the brush is a wheel-type brush including a disk-shaped wheel and a bristle member radially protruding from an outer periphery of the wheel, wherein a width of the bristle member in an axial direction of the wheel is larger than an interval between the teeth adjacent to each other, wherein the chamfering includes disposing the brush with respect to the green compact such that the axial direction of the green compact and the axial direction of the wheel intersect with each other, bringing a tip of the bristle member into contact with the tooth bottom edge constituted by the end surfaces of the green compact and a tooth bottom surface of the teeth at the outer peripheral surface, and relatively moving the brush in a circumferential direction of the green compact while rotating the brush, and wherein, in the chamfering, an amount of cutting in a radial direction of the green compact by the brush is 0.3 mm to 2 mm, an amount of cutting in the axial direction of the green compact by the brush is 0.3 mm to 2 mm, and a rotation speed of the brush is 200 m/min to 800 m/min.

2. The method of manufacturing the sintered gear according to claim 1, wherein, in the chamfering, the brush is rotated in a direction from an end surface of the green compact toward the tooth bottom surface.

3. The method of manufacturing the sintered gear according to claim 1, wherein, in the chamfering, the green compact is caused to rotate on an axis of the green compact.

4. The method of manufacturing the sintered gear according to claim 1, wherein the bristle member is constituted by resin fiber containing abrasive grains.

5. The method of manufacturing the sintered gear according to claim 1, wherein an amount of chamfering at an edge of each of the teeth is 0.1 mm to 1.0 mm.

6. The method of manufacturing the sintered gear according to claim 1, wherein a relative density of the green compact is 93% or more.

* * * * *